US007768989B2

(12) United States Patent
Nerses et al.

(10) Patent No.: US 7,768,989 B2
(45) Date of Patent: Aug. 3, 2010

(54) METHOD AND APPARATUS FOR MULTIPOINT VOICE OPERATION IN A WIRELESS, AD-HOC ENVIRONMENT

(75) Inventors: Annita Nerses, Arlington, VA (US); Robert M. Wetstein, Nanuet, NY (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 1163 days.

(21) Appl. No.: 11/071,588

(22) Filed: Mar. 4, 2005

(65) Prior Publication Data

US 2006/0198324 A1 Sep. 7, 2006

(51) Int. Cl.
*H04J 3/00* (2006.01)
*H04J 3/08* (2006.01)
*H04B 7/212* (2006.01)

(52) U.S. Cl. .............. 370/345; 370/321; 370/326; 370/336; 370/521

(58) Field of Classification Search ........ 455/41.1–41.3, 455/11.1, 463, 416; 370/321, 326, 336, 337, 370/345, 347, 478, 498, 521–528
See application file for complete search history.

(56) References Cited

U.S. PATENT DOCUMENTS

| | | | |
|---|---|---|---|
| 4,093,153 | A | 6/1978 | Bardash et al. |
| 4,574,378 | A | 3/1986 | Kobayashi |
| 5,206,452 | A | 4/1993 | Stamper et al. |
| 5,761,237 | A * | 6/1998 | Petersen et al. ............. 375/148 |
| 6,300,903 | B1 * | 10/2001 | Richards et al. ............ 342/450 |

(Continued)

FOREIGN PATENT DOCUMENTS

WO    WO 02/087172 A1    10/2002

(Continued)

OTHER PUBLICATIONS

Sunlin, R.C., "A hybrid distributed slot assignment TDMA channel access protocol", Military Communications Conference, 1990, MILCOM '90, Conference Record, 'A New Era'. 1990 IEEE, vol. 3, pp. 934-938, Sep. 30-Oct. 3, 1990.

(Continued)

*Primary Examiner*—Lester Kincaid
*Assistant Examiner*—Matthew Sams
(74) *Attorney, Agent, or Firm*—Edell, Shapiro & Finnan, LLC

(57) ABSTRACT

The present invention protocol offers guaranteed Quality of Service (QoS) for concurrent calls in a highly dynamic, scalable network. The invention employs a TDMA reservation technique to transmit voice traffic to multiple destinations and a CSMA/CA contention scheme to support data traffic. The present invention operates over a link-state based routing protocol that reliably floods routing and resource reservation information to network nodes. The present invention is suitable for general networking applications that require QoS for multimedia traffic in a mobile, Ad-Hoc network and enables conference calls to be established and operated in that type of network under various conditions. Moreover, the present invention capitalizes on certain properties of a radio, such as a RAKE type receiver, that sums up multiple, identical transmissions from multiple sources. In addition, the present invention enables roaming between and/or within a group or island of network nodes during the lifetime of a call.

41 Claims, 6 Drawing Sheets

U.S. PATENT DOCUMENTS

| | | | |
|---|---|---|---|
| 6,351,653 B1 * | 2/2002 | Alberth et al. | 455/552.1 |
| 6,405,027 B1 * | 6/2002 | Bell | 455/403 |
| 6,469,997 B1 | 10/2002 | Dorenbosch et al. | |
| 6,859,463 B1 * | 2/2005 | Mayor et al. | 370/445 |
| 6,873,839 B2 * | 3/2005 | Stanforth | 455/343.2 |
| 6,879,574 B2 * | 4/2005 | Naghian et al. | 370/338 |
| 6,993,354 B2 * | 1/2006 | Momosaki et al. | 455/517 |
| 6,993,361 B2 * | 1/2006 | Chitrapu | 455/562.1 |
| 7,035,252 B2 * | 4/2006 | Cave et al. | 370/356 |
| 7,177,658 B2 * | 2/2007 | Willenegger et al. | 455/522 |
| 7,292,845 B2 * | 11/2007 | Flannery | 455/416 |
| 7,409,218 B2 * | 8/2008 | Bonta | 455/453 |
| 2001/0033579 A1 * | 10/2001 | Nelson et al. | 370/447 |
| 2001/0045883 A1 | 11/2001 | Holdaway et al. | |
| 2002/0176399 A1 | 11/2002 | Wilmer | |
| 2003/0044654 A1 * | 3/2003 | Holt | 429/13 |
| 2003/0067892 A1 * | 4/2003 | Beyer et al. | 370/328 |
| 2003/0068975 A1 * | 4/2003 | Qiao et al. | 455/11.1 |
| 2003/0073430 A1 * | 4/2003 | Robertson et al. | 455/416 |
| 2004/0203373 A1 * | 10/2004 | Ogino et al. | 455/41.2 |
| 2005/0025182 A1 * | 2/2005 | Nazari | 370/469 |
| 2005/0041793 A1 * | 2/2005 | Fulton et al. | 379/211.01 |
| 2006/0198346 A1 * | 9/2006 | Liu et al. | 370/338 |

FOREIGN PATENT DOCUMENTS

| | | |
|---|---|---|
| WO | WO 03/058890 A1 | 7/2003 |
| WO | WO 03/084160 A1 | 10/2003 |

OTHER PUBLICATIONS

Sharp, B.A. et al., "Hybrid TDMA/CSMA protocol for self managing packet radio networks", Universal Personal Communications. 1995. Record., 1995 Fourth IEEE International Conference on, pp. 929-933, Nov. 6-10, 1995.

Papavassiliou, S. et al., "Performance evaluation framework and quality of service issues for mobile ad hoc networks in the MOSAIC ATD", MILCOM 2000. 21$^{st}$ Century Military Communications Conference Proceedings, vol. 1, pp. 297-303, Oct. 22-25, 2000.

Fontana, R. et al., "Recent advances in ultra wideband communications systems", IEEE Conference on Ultra Wideband Systems and Technologies, 2002 Digest of Papers, pp. 129-133, May 21-23, 2002.

System Requirements Specification for the SUO SAS Networking Subsystem, Feb. 13, 2002.

C. Li, et al. "Suo SAS Radio Intra-Networking Architecture," IEEE Milcom 2001, Oct. 28-31, 2001.

R. Ramanathan, et al, Hierarchically-organized, multihop mobile wireless networks for quality-of-service support, Mobile Networks and Applications 3, 1998.

* cited by examiner

METHOD AND APPARATUS FOR MULTIPOINT VOICE OPERATION IN A WIRELESS, AD-HOC ENVIRONMENT

STATEMENT REGARDING FEDERALLY SPONSORED RESEARCH OR DEVELOPMENT

The U.S. Government may have a paid-up license in this invention and the right in limited circumstances to require the patent owner to license others on reasonable terms as provided by the terms of Contract No. OTA #MDA 972-999-0007 awarded by the Defense Advanced Research Projects Agency (DARPA).

BACKGROUND OF THE INVENTION

1. Technical Field

The present invention pertains to a protocol to support Quality of Service (QoS) for point-to-multipoint voice conferencing in a mobile, Ad-Hoc wireless network. In particular, the present invention pertains to a scheme for conference call establishment, maintenance, and bandwidth reservation over IP networks that allows for half-duplex communication between a large number of call participants organized in a self-forming network supporting integrated voice/data traffic.

2. Discussion of the Related Art

Traditional cellular wireless network systems employ fixed base stations interconnected by a wired infrastructure in order to enable communication between mobile users within one hop of a corresponding base station. However, tactical communication systems must permit armed forces and their mobile platforms to communicate and move about freely without the restrictions imposed by wired communication devices. Further, a communications system for coordinating tactical operations functions in a distributed manner is required to avoid centralized control points that render the network vulnerable in the event of a failure.

In order to address the limitations of the cellular model, new applications have emerged that allow multi-hop communication between remote users without relying on the fixed infrastructure. For example, a system developed for the Multimedia Mobile Wireless Network (MMWN) project transports multimedia traffic over mobile, Ad-Hoc tactical networks. MMWN is based on a hierarchical network architecture and uses a set of link and network layer algorithms to support distributed real-time multimedia applications in a mobile, Ad-Hoc network. The MMWN system is based on a link-state routing distribution mechanism.

MMWN has the following three components: clustering techniques, location management, and virtual circuit setup and repair. The system constructs and maintains Elastic Virtual Circuits (EVC) to transport multimedia traffic. These circuits may include multiple branches to reach multiple call participants, are designed to adapt to node mobility, and allow for call participants to randomly leave and join the call throughout the lifetime of the circuit. Virtual circuits are formed on a hop-by-hop basis, where hop-by-hop routing is based on a distributed computation of the forwarding path. Each node along the circuit performs a Dijkstra calculation to determine the next appropriate hop. The circuits provide quality-of-service (QoS) routing, resource reservation and loop elimination in the presence of inconsistent routing information. These circuits further include a repair mechanism in case of node movement or failure. Maintenance and repair of the virtual circuit is based on link-state information and requires the transmission of control information.

A mobile, Ad-Hoc wireless network operates in a highly dynamic environment. Due to node mobility and multi-path and channel fading, routes and resource availability fluctuate rapidly at wireless nodes. State information used by traditional routing protocols is quickly rendered obsolete because the nodes move rapidly. Thus, routes frequently become disabled using traditional routing protocols and are continuously re-computed. This results in an interruption in data connection and a loss of quality at the application. Therefore, the QoS provisioning problem in wireless networks is significantly more challenging than in wired networks.

The virtual circuit setup scheme described above may not be suitable in a highly dynamic, bandwidth restricted environment because of the time and bandwidth required in setting up and maintaining the virtual circuit. In order to set up and maintain a virtual circuit and reserve resources, nodes along the circuit must transmit control messages issued by the source and sent toward call participants, where the call participants must respond to these messages. In scenarios with rapidly changing topology, the time interval required for the circuit to adapt to a topological change may exceed the time interval over which changes occur and, hence, exceed the time interval in which the protocol can adapt to the changes. Subsequently, routing tables may not be able to converge. In a highly volatile situation, this hop-by-hop routing mechanism tends to lead to inefficient routes, excessive bandwidth consumption and an inability to locate call participants.

The conference call service of the present invention extends the principles of a cellular system to a mobile, multi-hop Ad-hoc environment (e.g., Small Unit Operations (SUO)). Multimedia applications (e.g., digital audio and video) have stringent QoS requirements due to the timeliness of the information. In traditional single hop cellular networks, nodes learn about resource allocations via a base station. The present invention extends this solution to the multi-hop, Ad-Hoc environment, where the bandwidth required to support voice calls is reserved via a TDMA scheme. This guarantees the bandwidth for real-time traffic.

The present invention differs from the MMWN approaches described above with respect to at least the resource reservation scheme, call signaling procedure, and dissemination of voice packets through the network. The broadcast nature of a wireless medium provides opportunities for efficient dissemination of multi-destination voice packets. The present invention employs a TDMA reservation and broadcasting scheme. This type of scheme is not usually proposed for mobile, Ad-Hoc systems since the scheme is considered to consume excessive bandwidth. However, under highly mobile conditions, the omni-directional broadcast consumes minimal transmission resources at the transmitting node, incurs minimal delay for each hop, and is simple to implement. In the present invention scheme, no overhead associated with repair or maintenance of a circuit is necessary.

Further, wireless medium access control (MAC) protocols may cause a network to collapse due to the congestion that can result from control overhead (e.g., request to send (RTS)/clear to send (CTS)/acknowledgement (ACK)), wasted capacity and the retransmission of failed packets due to collisions, interference and blocking. A collision occurs when a node within range of a destination attempts to access a channel while receiving a packet. The RTS/CTS handshake can be very inefficient and the overhead associated with access schedules further decreases capacity. In order to avoid collapse of the networking communication system due to congestion, the broadcast and dynamic TDMA reservation approach of the present invention avoids the RTS/CTS overhead associated with scheduled access protocols by eliminating the need for contention.

In a mobile and volatile environment of a tactical communication system, traditional routing schemes can breakdown due to an inability to track a destination and the excessive bandwidth expended in the process. Since routing on a downlink from a base station to call participants is not required and since flooding (e.g., consuming valuable resources) is not employed, the present invention is suited for a dynamic, volatile environment.

SUMMARY OF THE INVENTION

The present invention protocol is designed to offer guaranteed Quality of Service (QoS) for a predetermined number of concurrent calls in a highly dynamic, scalable network, such as those found in the tactical environment. This protocol employs a Time Division Multiple Access (TDMA) reservation technique to transmit voice traffic to multiple destinations and a Carrier Sense Multiple Access/Collision Avoidance (CSMA/CA) contention scheme to support data traffic. The present invention protocol operates over a link-state based routing protocol that reliably floods routing and resource reservation information to nodes in a network. The present invention is suitable for general networking applications that require QoS for multimedia traffic in a mobile, Ad-Hoc network and enables conference calls to be established and operated in that type of network under various conditions (e.g., open-air terrain, buildings, etc.).

Moreover, the present invention capitalizes on certain properties of a radio, such as a RAKE type receiver, that sums up multiple, identical transmissions from multiple sources. Accordingly, simultaneous re-transmissions of voice packets by nodes within close proximity do not contend, but constructively interfere with each other, thereby reinforcing the strength and improving the range of the signal. In addition, the present invention enables roaming between and/or within a group or island of network nodes during the lifetime of a call and while the call is active in these islands. This roaming feature is achieved without additional control overhead.

The above and still further features and advantages of the present invention will become apparent upon consideration of the following detailed description of specific embodiments thereof, particularly when taken in conjunction with the accompanying drawings wherein like reference numerals in the various figures are utilized to designate like components.

DETAILED DESCRIPTION OF THE PREFERRED EMBODIMENTS

The present invention provides conference call capability in a multi-tiered network architecture, such as the Small Unit Operations Situational Awareness system (SUO SAS). However, the present invention may be applied to various types of networks. An exemplary network architecture that may be employed by the present invention is a multi-hop, wireless, Ad-Hoc network. This type of network does not include an infrastructure (e.g., there is no fixed base station as in a cellular network, where a single-hop environment of a cellular network becomes a special case) and may be utilized in a hostile network environment (e.g., a tactical battlefield, etc.) with unfriendly jamming.

Figure 1:
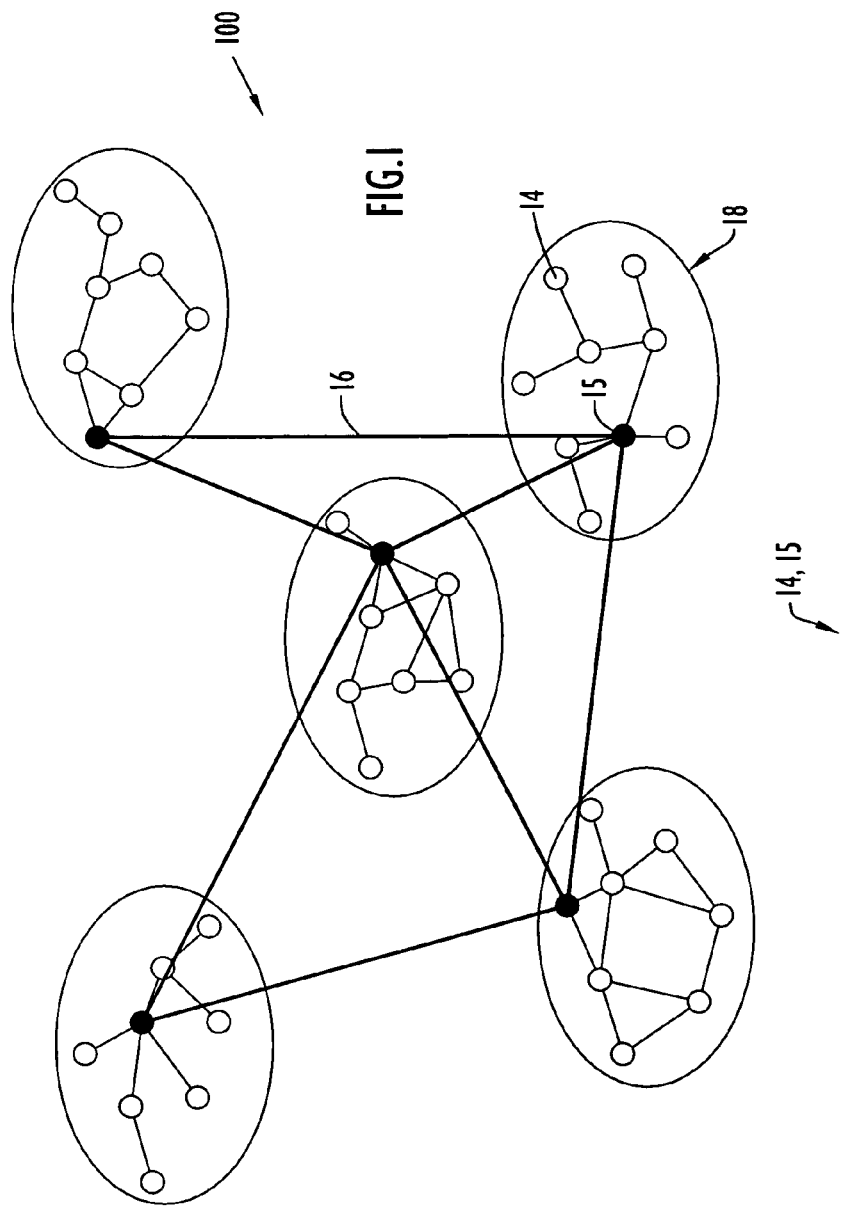
FIG. 1 is a diagrammatic illustration of network nodes according to the present invention arranged in an exemplary communication network.

An exemplary wireless Ad-Hoc network including network nodes according to the present invention is illustrated in FIG. 1. Specifically, network 100 includes a plurality of nodes 14 arranged in islands 18. Each island is in the form of a flat, multi-hop network and includes corresponding island member nodes 14 (e.g., with an approximate maximum of fifty nodes) with one of the member nodes designated as an island head node 15. Island heads allocate and release TDMA resources for active conference calls in their respective islands as described below. An island member node may be selected as an island head node via any conventional or other techniques and/or based on any desired criteria (e.g., node connectivity, signal strength, identification number, predetermined head nodes, etc.). The islands form a first tier of network 100 and facilitate communication within an island between the island head and member nodes and between the member nodes themselves. The head nodes of each island communicate with each other and form a backbone network 16. The backbone network forms a second tier of network 100 and facilitates communications between nodes of different islands (e.g., generally providing communications over greater distances). For example, a node 14 from a first island 18 desires to transmit a message to a node 14 of a second island 18. The node from the first island transmits the message to a corresponding head node of the first island that uses the second tier of network 100 to forward the message to a head node of the second island. The head node of the second island subsequently forwards the received message to the destination node. Alternatively, the nodes may be arranged to form a network including a single or any other quantity of tiers. The second tier may similarly include one or more islands of first tier head nodes (FIG. 3), where member nodes within each second tier island may be selected as a head node for that island as described above.

Figure 2:
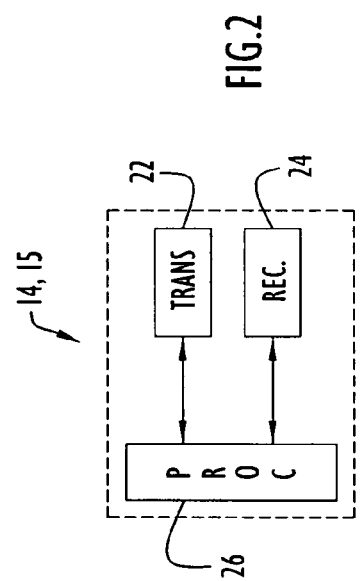
FIG. 2 is a block diagram of an exemplary node of FIG. 1.

A network node 14 according to the present invention is illustrated in FIG. 2. Specifically, node 14 includes a transmitter 22, a receiver 24 and a processor 26. The node may further include other components in accordance with a particular application (e.g., audio devices, etc.). The processor is preferably implemented by a conventional microprocessor or controller and controls the node to transmit and receive messages in accordance with the communication protocol described below. The transmitter is preferably implemented by a conventional transmitter and transmits messages from the processor, preferably in the form of radio frequency (RF)

signals, in accordance with processor instructions. Receiver 24 is typically implemented by a conventional receiver and configured to receive signals, preferably in the form of radio frequency (RF) signals, transmitted by the transmitter of another node. The receiver forwards the received signals to processor 26 for processing and is preferably in the form of a conventional RAKE type receiver to enable flooding of information with enhanced signal strength as described below. The node further includes an identification (ID) (e.g., a code or identification number) to identify the particular node and a database (not shown) to store information pertaining to neighboring nodes to facilitate reservations and/or routing. The identifier is unique to each node and preferably pre-assigned (e.g., a serial number or an identification number).

A head node 15 is substantially similar to node 14 described above. The head node has additional responsibilities including resource management, communicating with other head nodes, distribution of signals within an island and other protocol related functions as described below.

The network preferably employs a link-state type of routing protocol. The database of each node 14, 15 (e.g., island head and member nodes) maintains information enabling that node to determine appropriate paths for routing messages through the network. The information typically relates to links between the various network nodes. The node databases are synchronized in accordance with the routing protocol by transference of database update packets or messages between nodes that provide network connectivity information. In addition, each node (e.g., island head and member nodes) periodically broadcasts a beacon type or neighbor discovery packet. This packet advertises the presence of a node within the network and is typically utilized by nodes for "keep alive" and neighbor discovery purposes.

Figure 3:
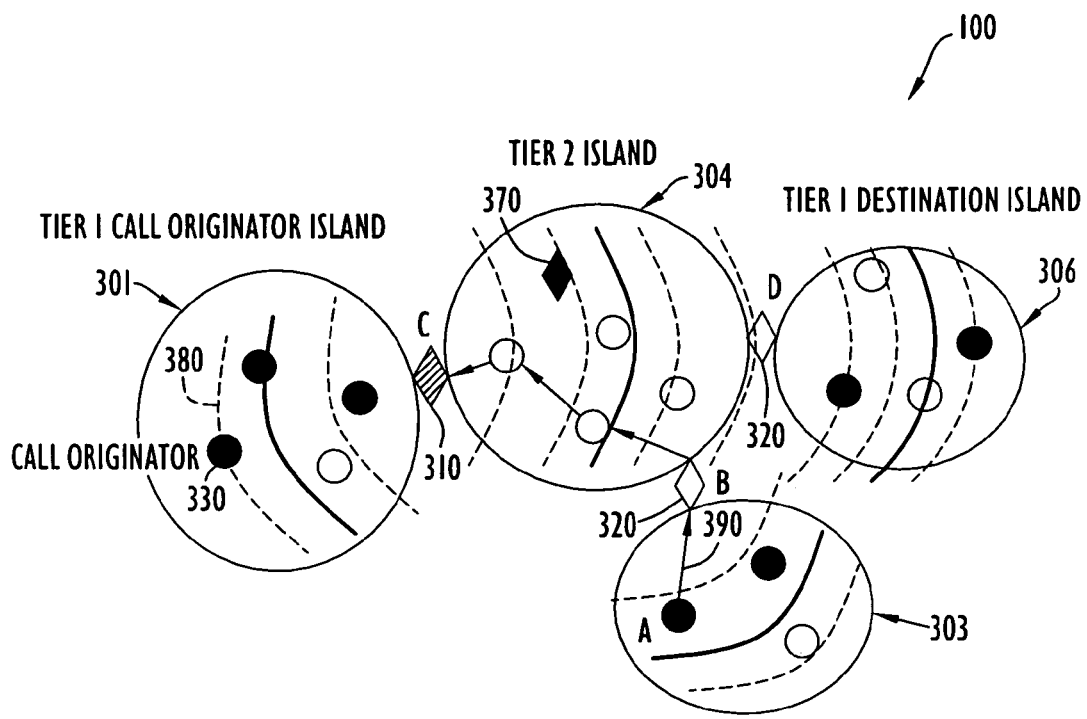
FIG. 3 is a diagrammatic illustration of the conference call service of the present invention employed on an exemplary communications network.

The present invention provides conference call capability for a mobile, multi-hop Ad-Hoc environment, while meeting challenging QoS requirements. Referring to FIG. 3, a portion of network 100 providing a conference call between participants includes a call originator island 301, a voice source island 303 and a destination island 306. These islands are each substantially similar to island 18 described above and reside on a first tier of network 100. The network further includes an intermediate island 304 residing on a second tier or backbone of the network. This island includes members that are designated as island heads for islands residing on the first tier of the network. The island heads of the first and second network tiers are responsible for allocating and releasing TDMA resources for active conference calls in their respective islands as described below.

Each island (e.g., group of nodes 14) of network 100 elects a base station 310, 320 for handling active calls in that island. The base station may be selected via any conventional or other techniques and/or based on any desired criteria (e.g., node connectivity, signal strength, identification number, predetermined base stations, etc.). Unlike traditional cellular systems, this base station is preferably mobile (e.g., there are no restrictions on the base station mobility). The mobile base station elected by each island is typically a head node of an island residing in the first network tier. However, any qualified member of an island may be selected as the mobile base station. The base station disseminates voice packets throughout a corresponding island using resources that are dynamically allocated for a conference call. The mobile base station forwards information from a speaker node for calls in a corresponding island using resources that have been allocated by the head of that island. With respect to an island residing on the second tier of the network, the base station may further be the head of that island, but any qualified member of the second tier island may be selected as the island head node.

The types of mobile base stations include source base station 310 and destination base stations 320. The source base station is the head of an island in the first tier of the network including a call originator 330 (e.g., source base station 310 is the head of call originator island 301). By way of example only, source base station 310 may act as a base station for both the first and second tiers, if necessary. A call participant may be call originator 330 or any of the originator-specified destinations that generate voice packets. When there are call participants (destinations) that are outside the island of the call originator, resources are requested from the head of second tier island 304 to enable communication with those external participants as described below.

Destination base stations 320 are nodes within the second network tier that are heads of islands within the first network tier including one or more final destinations. Destination base stations 320 act as the base station for their respective first network tier islands. The second network tier may further include destinations in the form of destination nodes. These nodes are basically nodes within the second network tier that are consumers and generators of voice packets.

A relayer is a node that relays voice packets broadcast from a corresponding mobile base station as described below. Each first and second tier island member may act as a TDMA relayer in a call (e.g., regardless of the member being a destination node for the packet). Relaying is performed for range extensions, where the number of relays for the voice packet is configurable.

Figure 4:
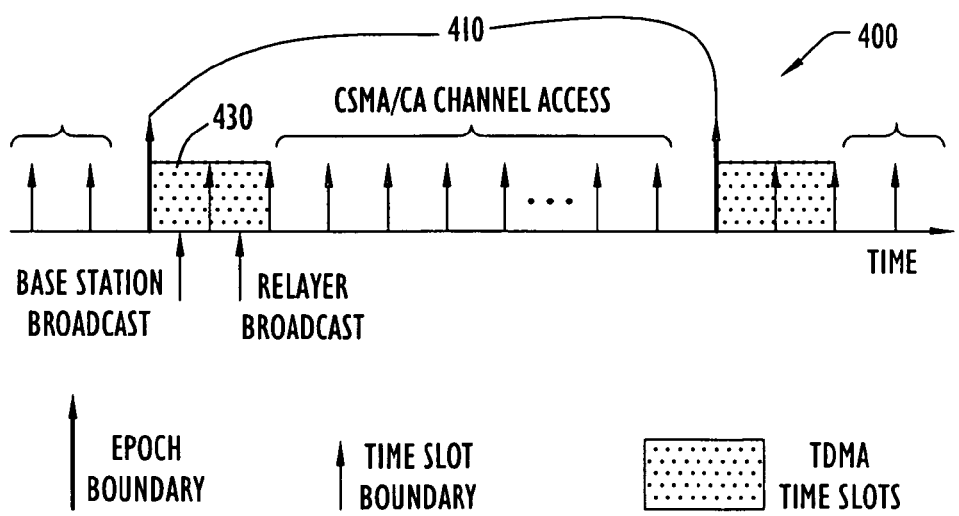
FIG. 4 is a diagrammatic illustration of an exemplary time-slot architecture supporting the conference call service according to the present invention.

Network 100 is preferably implemented as a time-slotted network system. Information timing is synchronized within radios or nodes using epochs, where each epoch has a fixed number of time slots. The present invention protocol provides QoS guarantees for each conference call by dynamically reserving and controlling resources within an island via a TDMA scheme. A CSMA/CA channel access scheme may be used for the transmission of control and user data. An exemplary TDMA architecture 400 employed by the present invention is illustrated in FIG. 4. Specifically, architecture 400 includes a plurality of epochs 410, each with a plurality of TDMA time slots 430. The initial time slots within each epoch 410 are reserved for base station and relayer node broadcasts, while the remaining time slots in the epoch are utilized for CSMA/CA channel access. The time slots may be arranged and/or utilized in any fashion. Upon creation of a conference call within an island, each island member reserves a configurable number of time slots 430 for each epoch 410 to support voice traffic in that island. The remainder of the slots in the epoch are utilized for CSMA/CA channel access of data and control traffic. The number of TDMA slots allocated for a single conference call is generally referred to as a block, where the slots are released upon termination of the call as described below.

A configurable number of time slot blocks are reserved and allocated on each network tier for conference call operation. Each block has a configurable number of TDMA slots. These configurable parameters are set for each tier in the network (e.g., the parameters have the same value for each node in a corresponding tier). In this fashion, the percentage of bandwidth dedicated to voice activity on each tier can be controlled. If an island head receives a block allocation request that exceeds a maximum slot parameter, the island head rejects the request. Since the maximum number of slots that can be allocated to TDMA voice operation is the same for all nodes (e.g., the same value is set for each node within the tier), each island member accepts a block allocation request initiated by the island head.

The time slots in a block can be viewed in terms of "groups," where a group includes the number of TDMA slots 430 necessary to transmit a single voice packet. Ideally, a slot group includes a single TDMA slot 430 (e.g., as viewed in FIG. 4, one slot of voice information associated with the base station and one slot of voice information associated with a relayer node). However, a slot group may include more than one TDMA slot when operating conditions do not permit a high enough data rate to enable a voice packet transmission to be completed within one slot.

In order to achieve range extension beyond the RF neighborhood of a base station, the present invention protocol allows for a configurable number of retransmissions of the voice packet by nodes receiving a voice packet sent in a TDMA slot group. Therefore, a block has a configurable number of slot groups, N, where N is the number of times a voice packet is broadcast within an island. For example, if N=2, a voice packet is relayed once within an island (e.g., as viewed in FIG. 4). TDMA blocks for multiple calls are typically added or released contiguously, but may be added or removed in any fashion. The release or allocation of blocks typically becomes effective at the start of a new epoch.

Resource information may be broadcast by using a link-state based flooding protocol for the dissemination of resource allocation/de-allocation advertisements. When an island head decides to allocate or de-allocate resources for a new or terminating conference call, the island head may utilize a network (e.g., SUO) routing manager (e.g., an application in the island head node processor) to disseminate the conference call reservation advertisements to the nodes within the corresponding island via a reliable link-state based flooding mechanism. In this fashion, the nodes learn about the creation or termination of a call in the same manner in which the nodes exchange routing information. Since the link-state based flooding protocol is reliable, the island members receive the call reservation advertisements.

Resource allocation messages may be stored in the routing manager database. Therefore, as nodes roam through the network, resigning and joining islands, the nodes learn of active conference calls in their new island during a routing manager database exchange within an island join process. In this manner, a call participant can roam (e.g., be mobile) and maintain call participation, with limited interrupted service, while the call is active in the new island.

The present invention protocol employs "up-links" 390 (FIG. 3) and "down-links" 380 to transfer voice and associated information. Up-link 390 generally refers to the path over which source base station 310 receives a voice packet from a speaker or voice source node. By way of example, the call participant that is speaking may utilize a network (e.g., SUO) unicast point-to-point service as the up-link to source base station 310. Voice packets that originate from the speaker node are routed via the up-link point-to-point service in a manner similar to high-priority data using a network (e.g., SUO) unicast routing protocol over a CSMA/CA channel access scheme. When a base station is the speaker node, an up-link is not required and the base station voice packet is simply transmitted on a TDMA slot.

Upon receiving a voice packet from an up-link (or originating its own voice packet), source base station 310 holds each packet until the beginning of an assigned block of TDMA time slots reserved for that call. On the first TDMA slot of the appropriate block, base station 310 broadcasts that packet on the first network tier to island members within range of the transmission. This TDMA distribution mechanism is referred to as the down-link (e.g., the dashed arc lines represent the TDMA down-link and the bold arc line represents the maximum physical, or RF, range of the first hop as viewed in FIG. 3) and does not rely on routing. Therefore, this mechanism is highly desirable in a very dynamic environment where routing tables may not converge.

Each island member receiving the source base station broadcast re-broadcasts the received voice packet on the next TDMA slot group. This rebroadcast can be done a number of times for range extension, provided that the appropriate number of slots to accommodate N broadcasts of the voice packet are allocated to the block. Therefore, a radio must be within N physical hops from the base station in order to receive a packet on the down-link.

Even though nodes re-broadcasting packets are in close proximity, the re-broadcasting nodes capitalize on the ability of the node RAKE receiver (e.g., within voice transceiver 22 of FIG. 2) to enhance the quality of the information stream by coherently adding the energy from identical, multiple signals. In particular, the broadcast is realized using the principle of a conventional RAKE receiver to remove multi-path interference from a desired signal. The transmitted signal is modulated using a pseudonoise sequence. If the phase difference between the multi-path signal and the desired signal is sufficiently low, the multi-path and desired signals are combined constructively. Otherwise, the multi-path signal is removed. The same principle can be applied to simultaneous transmissions from multiple sources when the data transmitted from each source is the same. In other words, the transmitted signals add constructively if the received phases of these signals are within a tolerable limit. In this fashion, the signal-to-noise ratio (SNR) is increased at each receiver node. Island members (e.g., including the base station) listen for the first slot group of a block when not transmitting a packet on that group.

Each island of a first network tier has only one base station, where the base station transmits in the first slot group of each block. However, since an island of the second network tier may have plural base stations, each second tier node acts as an island member when that node is not the base station for a particular call or block. If a packet is received in the first slot group, a radio immediately relays the received voice packet on the next slot group of the block. Once a node has received a voice packet in a slot group of a particular block, the node does not process any other packets received in that block. This relay process continues until the number of groups in the block is exhausted. If the radio is a call participant, the voice packet is processed (e.g., for transference to a user via audio devices of a node). In order to prevent the speaker from hearing an echo of the speaker voice packet, a node may not process any voice packets received in a TDMA block that were created by a voice application of that node.

Similarly, island members receiving the broadcast on subsequent slot groups in the block perform the steps specified above. If a node is out of range and does not receive any voice packets throughout the block, the node continues to monitor and maintain the reservation for the blocks of an active call until the corresponding island head releases the resources for the call, or until the node leaves the island.

If there are any destinations outside the speaker island and a second tier island head has allocated resources for the call over that tier, source base station 310 broadcasts the voice packet within the first tier island associated with the source base station and over the second tier TDMA down-link. In order to enhance spatial reuse, the down-link transmissions on TDMA slots in different islands can be on different spreading codes in order to reduce inter-island interference.

The manner in which an exemplary conference call is conducted according to the present invention is illustrated in FIG. 3. Specifically, node 'A' is designated as the speaker node in island 303. Node 'A' may use a point-to-point up-link to send data to source base station 'C'. Source base station 'C' receives the data from the up-link and broadcasts the voice data, via a down-link or the reserved TDMA time slots, in second tier island 304 and first tier island 301 associated with the source base station.

Destination base stations 'B' and 'D' within the second tier receive the TDMA broadcast and use a TDMA down-link to broadcast the voice data in their respective first tier islands 303, 306. The TDMA broadcast on the second tier is treated as an up-link by the receiving destination base stations even though the broadcast originated as a down-link by source base station 'C'. This is necessary because each of the destination base stations is responsible for re-broadcasting the voice packet into corresponding first tier islands (e.g., if any destinations reside in those islands).

Speaker node 'A' forwards voice packets directly to source base station 'C'. Therefore, destination base station 'B' does not broadcast the voice packets of speaker node 'A' in the corresponding first tier island until destination base station 'B' receives the source base station broadcast over the second tier. Specifically, speakers forward their voice packets directly to the source base station, where the destination base stations do not broadcast the voice packet in corresponding first tier islands until the source base station has broadcasted over the second tier. In this manner, the source base station determines the speaker to prevent the possibility of separate conversations being conducted in different islands over the same conference call.

Call participants may roam between islands and maintain participation in the call. Therefore, if node 'A' moves and is forced to leave its island and join, for example, call originator island 301, node 'A' is able to continue participation in the call when the island handoff is achieved.

Figure 5:
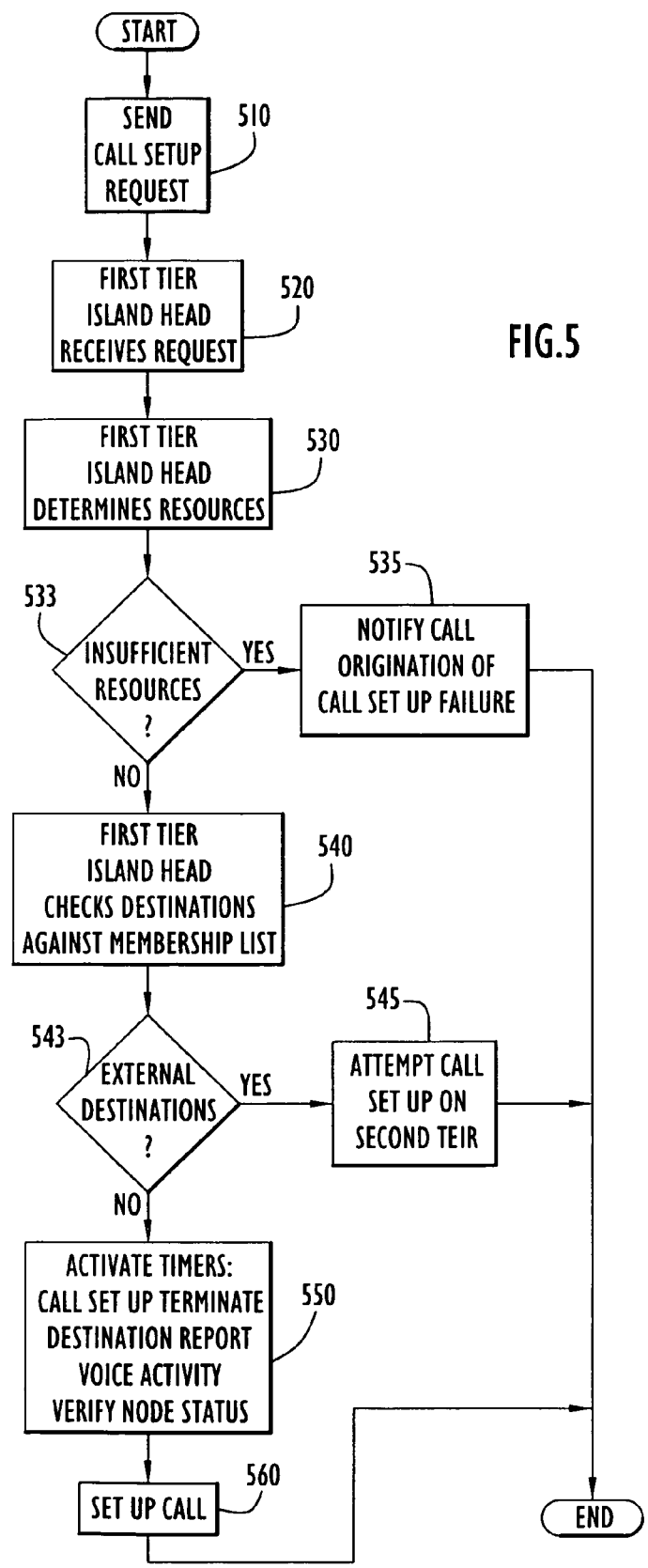
FIG. 5 is a procedural flow chart illustrating the manner in which a conference call is originated according to the present invention.

In order to conduct a conference call, a variety of functions are performed including originating the call, setting up the call, conducting conversation, and terminating the call. Control packets are data messages exchanged between radios for establishing, maintaining, and terminating a call. With the exception of the resource allocation/de-allocation messages that are flooded by an island head described above, control packets may be sent as normal point-to-point messages using a network (e.g., SUO) unicast service. An exemplary call origination on the network according to the present invention is illustrated in FIG. 5. Specifically, in order for a node to originate a conference call, the node must belong to network 100 as either an island member or an island head. A node 330 (FIG. 3) originates a conference call by sending a call setup request to a corresponding first tier island head at step 510. Call requests are forwarded to the island head because the island head is responsible for TDMA slot resource management in a corresponding island. By way of example only, the call originator island head is source base station 310; however, the island head may be any other desired island member where the functions described herein may be assigned to the island head and base station in any fashion.

Upon receipt of the call setup request from the call originating node at step 520, source base station 310 determines at step 530 the availability of resources (e.g., time slot blocks) to support the call on the first network tier. Each call requires one block of TDMA slots. The number of allowed TDMA slots for each epoch on a network tier is a configurable parameter. If resources are not available on the first tier as determined at step 533, the source base station notifies the call originator that the call set-up has failed due to unavailable resources at step 535. In this case, the call cannot be set-up and the source base station performs no further actions.

If resources are available on the first tier, the source base station checks the island membership list to determine the destinations within the source base station island at step 540. Any destinations that are not on this list are considered to be "external" destinations. If there are external destinations as determined at step 543, the source base station attempts to set-up the call on the second network tier at step 545. Otherwise (e.g., no external destinations exist and resources are available on the first network tier), the source base station controller or processor activates a number of timers at step 550, including a call setup terminate timer, a destination report timer, a voice activity timer, and a verify node status timer. Once the timers are activated, the source base station proceeds to set-up the call on the first network tier at step 560.

The call set-up terminate timer controls call set-up. In response to expiration of the call set-up terminate timer, the source base station examines the total number of acceptances and the number of acceptances from external destinations. When no external destinations have accepted the call, the source base station notifies the second tier island head to terminate the call on that tier. If no destinations have accepted the call, the source base station terminates the call on the first tier.

The destination report timer sends a destination call status report to the call originator. This timer measures a time interval less than that of the call set-up terminate timer and is continuously reset until expiration of the call set-up terminate timer. In response to expiration of the destination report timer, the source base station resets that timer and sends a partial destination report to the originator, if any changes have been determined. When there have been no changes in destination status, the source base station resets the report timer without sending a report. The destination status report lists the status of destinations (e.g., local first tier island and/or external) with respect to accepting or rejecting the call.

The voice activity timer is a fail-safe feature. This timer is re-started each time the source base station receives a voice packet for a conference call. If the voice activity timer expires because no packets have been received, the source base station terminates the call. Since mobility may cause nodes to move within and beyond TDMA relay range, this timer affects the source base station and is not run in any other node. The verify node status timer is used to periodically verify that the call originator is still in the first tier island. When the originator leaves the first tier island, the source base station terminates the call and releases resources on each tier.

Figure 6:
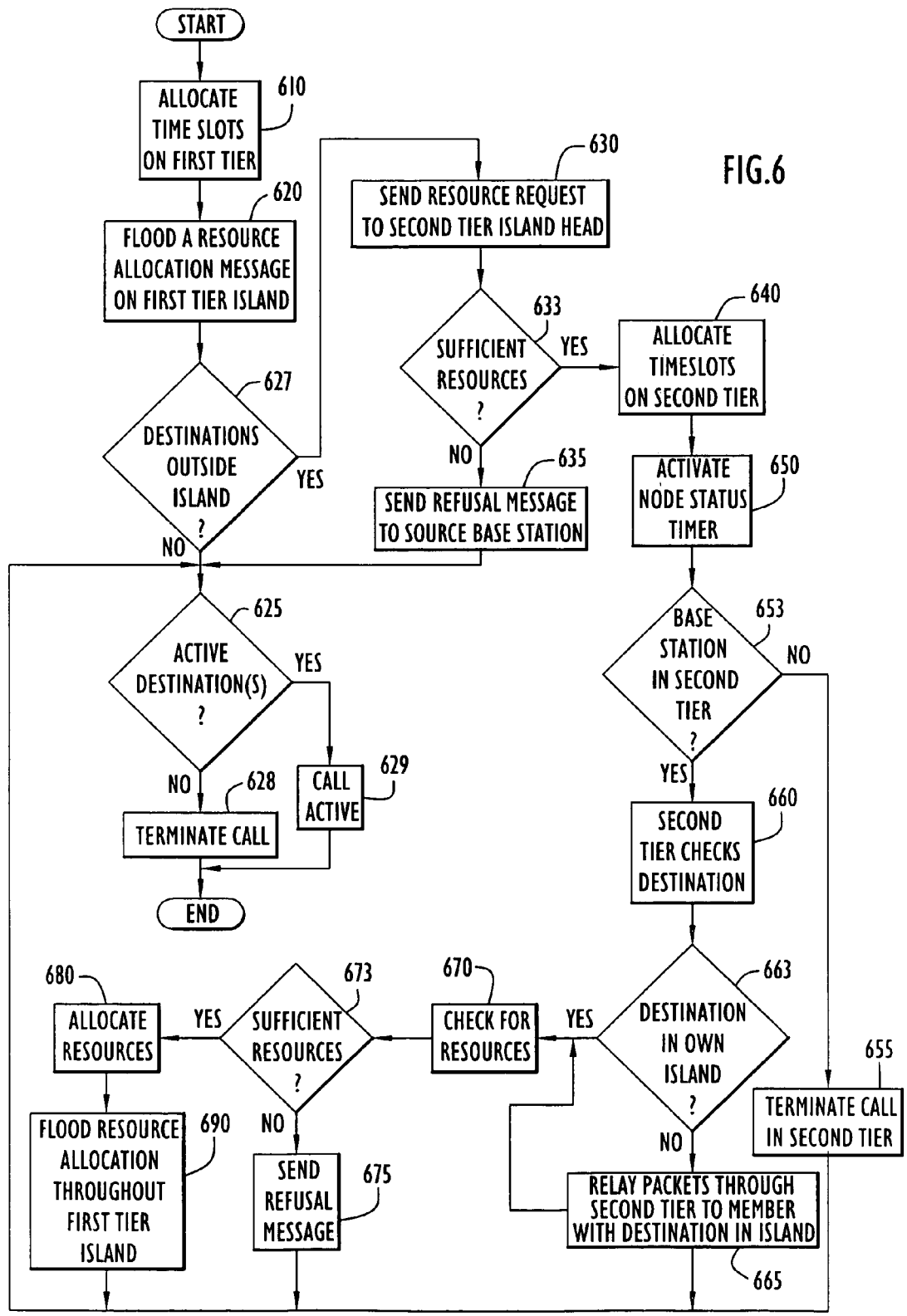
FIG. 6 is a procedural flow chart illustrating the manner in which a conference call is established according to the present invention.

An exemplary call set-up on the network (e.g., steps 545, 560 of FIG. 5) according to the present invention is illustrated in FIG. 6. Specifically, when setting up a call within the source base station first tier island (e.g., step 560 of FIG. 5), the source base station allocates a block of time slots on that tier for a new call at step 610. The source base station floods, via an internal routing engine, a resource allocation message through the source base station first tier island at step 620 (e.g., via link-state based flooding as described above). The message includes the call ID, call originator ID, and the list of destinations. The message further includes the total number of blocks and associated call IDs that each node should recognize as being allocated to conference call voice traffic within the island. The destinations that are in the first tier island are expected to respond to this message at step 625 as described below.

If there are destinations outside the originator first tier island, the source base station requests resources from the second tier island head before the source base station begins setting up the call on the second tier (e.g., step 545 of FIG. 5). The source base station, by way of example, is a base station for the second tier; however, any second tier nodes may serve as a base station. The source base station sends a resource request message to the second tier island head at step 630 in response to destinations residing outside the originator island as determined at step 627. The resource request message includes a list of destinations and requests that the second tier island head allocate TDMA voice slots on that tier. The source base station attempts to reach the second tier island head a predetermined number of times before aborting the second tier set-up.

Upon receipt of the resource request message from the source base station, the second tier island head determines the availability of resources (e.g., TDMA blocks) to support the call on the second tier. If resources are available to support the call on the second tier as determined at step 633, the island head allocates a block of time slots on the second tier for the new call at step 640 and uses a unicast routing engine to flood a resource allocation message through the second tier island. The resource allocation message includes the list of destinations. The second tier island head further activates a timer to periodically verify that the source base station is still in the second tier island at step 650. When the source base station is not in the second tier island as determined at step 653, the island head terminates the call throughout the second tier at step 655 to prevent a waste of resources. If resources are not available to support the call on the second tier as determined at step 633, the island head sends a resource refusal message to the source base station at step 635 and takes no further action.

In response to the presence of the source base station in the second tier and receipt of a resource allocation advertisement from the second tier island head, a second tier island member determines at step 660 the presence of any of the destinations within the member island. If no destinations reside in the member island as determined at step 663, the second tier member performs relaying functions for the call through the second tier at step 665. In order to accomplish the relaying function, the second tier island member reserves resources (e.g., TDMA slots) for the call on the second tier. When a listed destination resides in the island of a second tier island member, the island member further acts as a destination base station for the member island. In this case, the destination base station determines the availability of TDMA resources within the corresponding first tier island to support the call at step 670. If the destination base station determines that resources are unavailable at step 673, the destination base station notifies the source base station via a point-to-point resource refusal message at step 675. The resource refusal message indicates those external nodes that are currently unreachable in the destination base station first tier island. When resources are available, the destination base station allocates resources in the member first tier island for the call at step 680 and uses an internal routing engine to flood the resource allocation advertisement through that first tier island at step 690 (e.g., via link-state based flooding as described above). The resource allocation message contains the full destination list.

Each recipient of the flooded call advertisement within the originator and destination first tier islands reserves the block for a new voice call. In addition, when the recipient is listed as a destination, the recipient node determines whether or not to participate in the call and notifies the corresponding base station (e.g., source base station for originator island nodes and destination base station for external nodes).

After the call originator has sent a call set-up message to the source base station at step 620, the originator expects a response back from the named destinations at step 625. A base station on each network tier gathers responses from corresponding members. External destinations individually send results to their respective destination base station over the first network tier. The destination base station gathers the results and forwards the results to the source base station over the second network tier. The source base station receives results from corresponding nodes and destination base stations and sends the results to the originating node over the first network tier.

When no destinations (e.g., external or within originator island) accept the call as determined at step 625, the call is terminated at step 628. If no destinations in the destination base station island accept call participation, the destination base station de-allocates blocks on the first network tier for this call and floods a call terminate message in the first tier island. When no destinations (e.g., external or within the originator first tier island) have accepted the call by expiration of the call set-up terminate timer, the source base station notifies the call originator via the destination report and floods a call terminate message through the first tier.

The originating node considers the call to be active at step 629 when one or more destinations (e.g., external or within the originator island) have accepted call participation. The originator can receive subsequent destination reports from the source base station throughout the lifetime of the call. These reports notify the source base station of destinations that leave the call and late destination acceptances and rejections. If the source base station no longer has any active external destinations, the source base station notifies the second tier island head to terminate (de-allocate call blocks) the call on the second tier. However, this does not affect call operation in the originator first tier island. When no destinations (e.g., external or within the originator island) have accepted the call, the source base station notifies the originator and terminates the call as described above.

Figure 7:
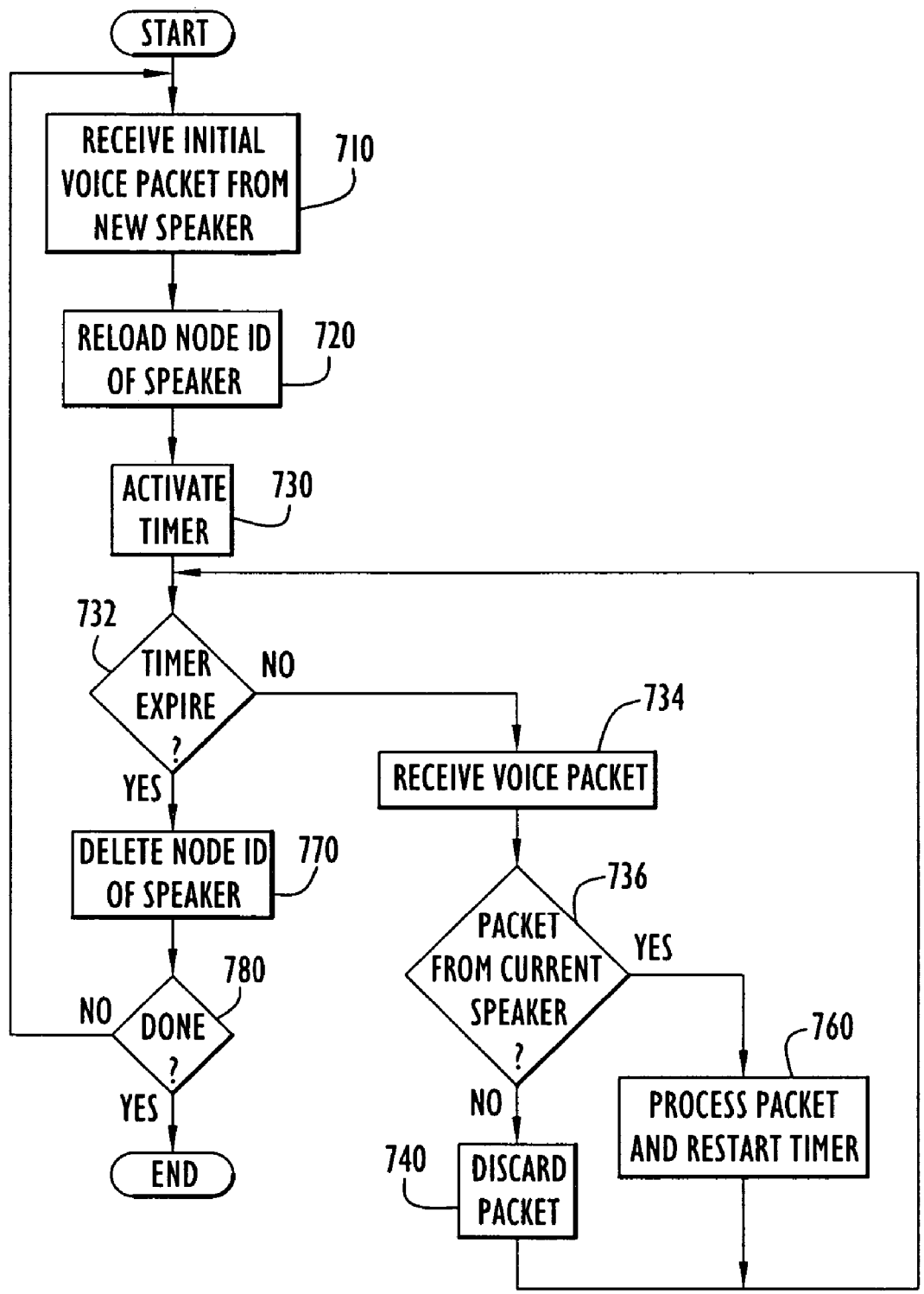
FIG. 7 is a procedural flow chart illustrating the manner in which a conversation is conducted during a conference call according to the present invention.

Once the call is originated and set-up, voice packets are transferred between the call participants to conduct a conference call. The manner in which a conference call is conducted according to the present invention is illustrated in FIG. 7. Initially, normal conversational protocols will ensure that only one person talks at a time. If several people talk simultaneously, the first of these is the only one able to acquire the down-link. In order to ensure only one "speaker" is active at a time, the source base station implements a turn around timer for each active call. The initial state of this timer is set to IDLE. When the turn around timer expires, the source base station waits to receive a voice packet broadcast on the TDMA down-link of the call. The originator of this voice packet is generally referred to as the current speaker. Specifically, the initial packet from the up-link is received at step 710 and the source base station records the Node ID of the current speaker at step 720 and starts the turn around timer at step 730. If the timer has not expired as determined at step 732, a voice packet is received from the up-link at step 734. If the packet is from the current speaker as determined at step 736, the source base station processes the packet (e.g., transmits the packet via TDMA down-links to call participants that receive and process the packet voice information to conduct the call as described above) and re-starts the turn around timer at step 760. If the packet is not from the current speaker, the source base station discards the incoming up-link voice packet at step 740. When the turn around timer expires as determined at step 732, the source base station deletes the Node ID of the previous speaker at step 770 to allow another call participant to speak. The process continues until the call terminates as determined at step 780.

During the course of a call, a destination node may voluntarily resign from participation in a conference call. In this case, the destination node uses a point-to-point service to send a destination leave message. In addition, a node initially listed as a destination, but not providing a response may issue a late destination acceptance or rejection, if (a) the response did not reach the originator in time; or (b) the node becomes aware of the call during an island join process. In the island join process, the node learns of the call when the node link state advertisements (LSA) database (e.g., containing the resource allocation message) is updated. These messages eventually reach the call originator, but are recorded by the various base stations along the route. When a call is terminated, the call termination procedure is similar to the set-up procedure described above, where each tier island head is responsible for de-allocating TDMA resources and for flooding a call terminate message throughout a corresponding island. The initiation of a call termination, under normal conditions, comes from the call originator.

Figure 8:
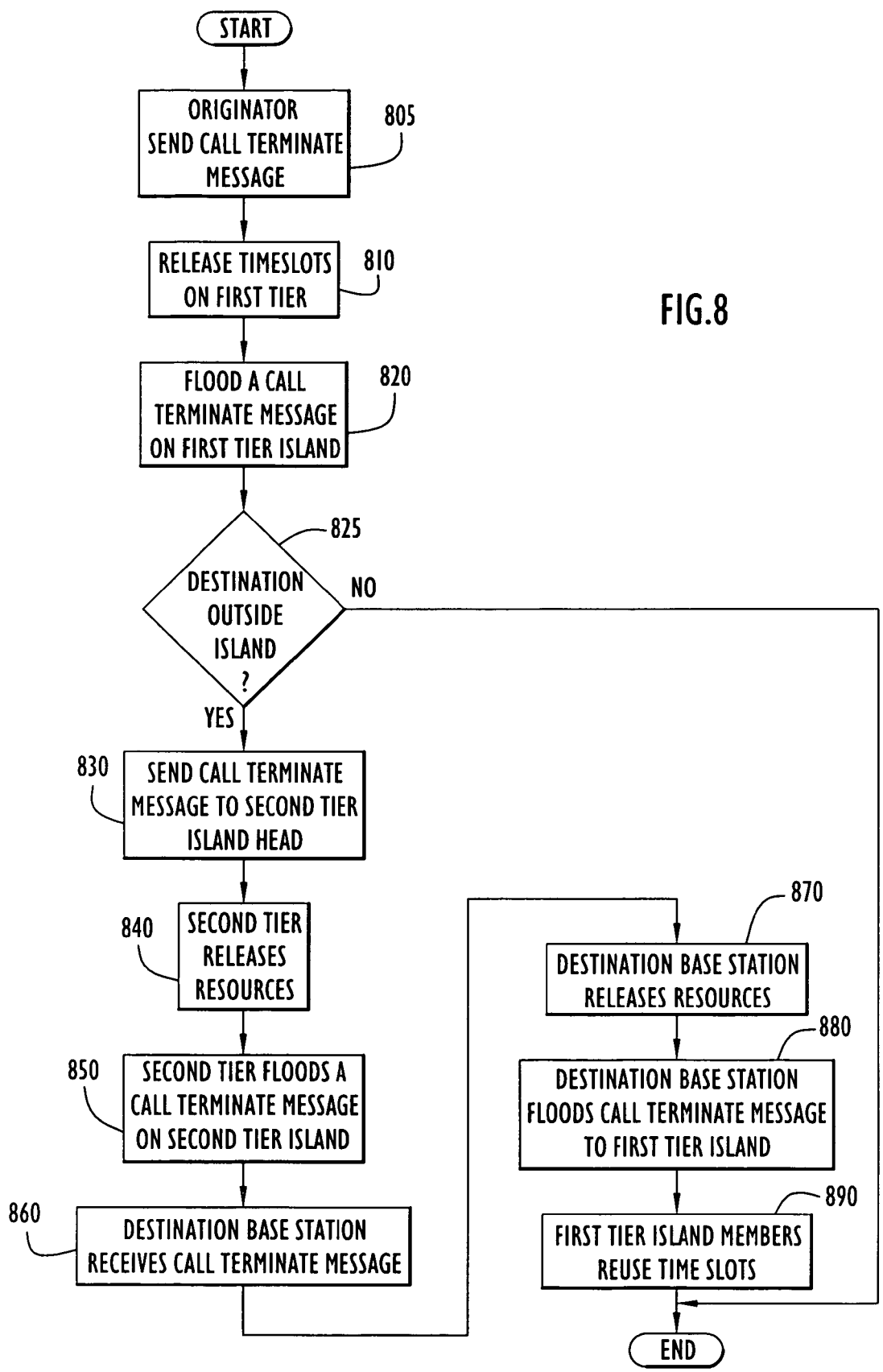
FIG. 8 is a procedural flow chart illustrating the manner in which a conference call is terminated according to the present invention.

The manner in which a call is terminated according to the present invention is illustrated in FIG. 8. Generally, only the call originator has the authority to end a call that the originator created. The originator initiates call termination by sending a call terminate message to the source base station at step 805. This may be accomplished by using a network (e.g., SUO) unicast routing manager as described above.

The island heads follow a common set of procedures for call termination within their corresponding islands. In addition, the source base station terminates portions of the call external to the source base station island. In particular, a source base station terminates the call under the following conditions: (a) the source base station receives a call terminate message from the call originator; (b) the voice activity timer expires, indicating no voice activity on the conference call; (c) the active destinations have left the call; or (d) the originator has left the island.

The source base station begins call termination in the source base station island by releasing the block (e.g., TDMA time slots) for the call at step 810 and flooding a call terminate message for the particular call throughout that island at step 820. The call terminate message contains information regarding the number of blocks (and associated call ID) to release. If there are destinations that reside outside of the call originator island as determined at step 825, the source base station further sends a call terminate message to the second tier island head at step 830. The second tier island head releases resources for the call on the second tier at step 840 and floods a call terminate message throughout the second tier island at step 850. Upon receiving a flooded call terminate message from the second tier island head at step 860, each destination base station releases the resources for the call at step 870 and floods a call terminate message throughout the destination base station island at step 880. When a first tier island member receives a flooded call terminate message (e.g., from the source or destination base station), the island member releases the reserved block for the call at step 890. If the island member is also a destination for the call, the member terminates participation in the call.

A call may be terminated unexpectedly. "Abnormal" conditions refer to an unexpected loss of connectivity due to the highly dynamic nature of the network environment. In order for a local node to monitor connectivity to another node, the local node activates a periodic timer throughout the duration of the call. Upon expiration of this timer, the local node examines the node routing tables to determine the presence of connectivity to a selected node. Under normal conditions, only the call originator has the authority to end a call. However, under abnormal conditions, such as loss of connectivity or an island merge, care must be taken to ensure that unneeded TDMA resources are properly released. Since the island head is responsible for normal release of these resources, a separate release mechanism is provided for the case in which connectivity has been lost to the island head or base station, or the base station resigns from island head status.

In some cases, an external portion (e.g., external destinations) of a call is terminated, while the portion within the originating island is retained. For example, when the source base station loses connectivity to a second tier island head or all external destinations have left a call, normal call termination procedures cannot be performed. In these cases, the source base station immediately cancels the external portion of the call by de-allocating the call TDMA resources and sending a call terminate message to the second tier island head. A destination node receiving the call terminate message ceases participation in the call.

If a second tier island head loses connectivity to the source base station, the second tier island head is unable to receive a normal call terminate message. Therefore, the second tier island head terminates the second tier portion of a call in response to the absence of connectivity to the source base station. This is accomplished by the second tier island head de-allocating the call second tier TDMA resources and flooding a call terminate message throughout the corresponding second tier island. A destination node receiving the call terminate message ceases participation in the call as described above.

A destination base station terminates a call, for example, in response to the absence of connectivity to a corresponding second tier island head. This ensures that the destination base station releases the resources for any active calls over the second tier, where only the second tier island head can accomplish this task under normal conditions. In order to terminate the first tier segment of the call, the destination base station de-allocates the call TDMA resources on the first tier and floods a call terminate message throughout the destination base station first tier island.

An island member (e.g., call originator and active destinations) ceases participation in the call when, for example, the member loses connectivity to an island head or leaves the island.

While the present invention has been described and represented within a network architecture, the present invention may be implemented solely as software as well as a combination of both software and hardware, or even as hardware alone. The above description is not meant to limit the present invention to a hardware design or a particular network architecture, as many variations are possible and within the scope of the above description.

It will be appreciated that the embodiments described above and illustrated in the drawings represent only a few of the many ways of implementing a method and apparatus for multipoint voice operation in a wireless, Ad-hoc environment.

Communication networks employing the present invention nodes may include any quantity of those nodes and may be of any type of network (e.g., cluster or island based, CBT, Ad-Hoc wireless, etc.). The network nodes may be arranged in any fashion into any quantity of islands each having any quantity of any types of nodes (e.g., member nodes, head nodes, base stations, etc.). The backbone network may include any quantity of head nodes, while communications within an island and between neighboring island head nodes of the backbone network may utilize the same or different transmission frequencies. The formation of islands and designation of head nodes and base stations may be predetermined or accomplished dynamically via any conventional or other algorithm or technique.

The present invention node may include any quantity of conventional or other transmitters and/or transceivers, where each transmitter or transceiver may transmit signals at any suitable frequency and in any suitable energy form (e.g., radio signals, microwave, optical signals, etc.), and any quantity of conventional or other receivers or transceivers, where each receiver or transceiver may receive signals at any suitable frequency and in any suitable energy form (e.g., radio signals, microwave, optical signals, etc.). The present invention node may include any quantity of independent transmitting and/or receiving devices, may utilize any quantity of frequency channels of any desired frequencies and may send voice and/or data. The present invention node may employ any conventional access scheme or protocol to access and/or transmit information. The present invention node may further include any quantity of any types of input or control devices (e.g., buttons, switches, etc.) to control node operation. The node may be in the form of any type of radio unit or other communications device. The present invention node may include any type of identification including any quantity of any type of symbols or characters (e.g., numeric, alphabetic, alphanumeric, etc.), preferably including a predetermined hierarchy or order.

The processor of the present invention node may be implemented by any conventional or other microprocessor, controller or circuitry to perform the functions described herein, while any quantity of processors or processing devices or circuitry may be employed within the present invention node, where the processor functions may be distributed in any fashion among any quantity of hardware and/or software modules, processors or other processing devices or circuits. The software for the processor of the present invention node may be implemented in any suitable computer language, and could be developed by one of ordinary skill in the computer and/or programming arts based on the functional description contained herein and the flow charts illustrated in the drawings. Further, any references herein of software performing various functions generally refer to processors performing those functions under software control. The software and/or algorithms described above and illustrated in the flow charts may be modified in any manner that accomplishes the functions described herein. The present invention node may alternatively include any components arranged in any fashion to facilitate point-to-multipoint conferencing in the manner described above.

The packets or messages transmitted by the network (e.g., resource assignment, call set-up, call terminate, resource and other requests, neighbor discovery, link-state updates, etc.) may be of any size, may have any format and may contain any desired information. The packets may be transmitted at any suitable transmission rate or have any desired interval between transmissions. The various messages or packets may include any identifier to identify the type of message or packet. The packets may be broadcasted or transmitted any quantity of times.

The TDMA architecture may be of any quantity and include any quantity of any types of epochs with any quantity of any types of time slots. The architecture may include any desired period, where the time slots and epochs may include any desired durations. The slots may be reserved or assigned in any manner (e.g., static, dynamic, central, distributive, etc.) based on any desired conditions, where the architecture (e.g., epochs, time slots, etc.) may be arranged in any fashion. The assignment may assign any time slots from any epochs to corresponding nodes in any desired manner. The architecture may include any quantity of slots arranged or assigned in any fashion (e.g., reserved for specific purposes, for a particular application, for voice, for data, for channel access or CSMA/CA, for the base station, destination and relayer nodes, etc.). The network may utilize any quantity of blocks each including any quantity of groups, where the groups may include any quantity of time slots for transmission of a voice or other packet. The present invention and/or architecture may be structured to be compatible with any network or transmission scheme (e.g., time division multiplexing, TDMA, etc.).

The database update and neighbor discovery packets may be transmitted at any desired intervals and/or in response to any desired events or conditions. The node database may be implemented by any conventional database or other storage structure (e.g., processor memory, external memory, file, data structure (e.g., array, queue, stack, etc.), etc.) and may have any desired storage capacity to contain any desired information.

The time slot assignments may be transmitted in any desired manner (e.g., flooding, embedded in a messages, assignment message, etc.), where any quantity of retransmissions may be transmitted in a transmission time period. The TDMA messages may include any desired information in any desired time slots. The timing architecture may be adjusted in any manner (e.g., period, quantity of epochs, groups or time slots, etc.) in accordance with network or other conditions.

The present invention may utilize any quantity of timers of any types (e.g., hardware units, software modules, etc.). The present invention timers (e.g., call setup terminate timer, destination report timer, voice activity timer, verify node status timer, turn around timer, etc.) may utilize any desired time intervals for any network operations (e.g., call set-up, voice transmissions, etc.). The nodes may utilize any desired scheme to maintain or determine a current speaker of a conference call (e.g., record a node or other identification, token passing or round-robin type techniques, utilize a specific speaking order, etc.).

The various variables described above (e.g., N, etc.) are preferably integers; however, the variables may be of any type of numbers (e.g., real, integer, etc.). The flood or broadcast may be accomplished based on any types of transmissions enabling superposition of signals and/or removal of multi-path interference.

It is to be understood that the present invention is not limited to the applications or networks described herein, but may be utilized for various communication applications or networks, especially wireless Ad-Hoc radio networks. For example, the present invention may be utilized for general networking applications that require QoS for multimedia traffic in a mobile, ad-hoc network under various conditions (e.g., air terrain, buildings, etc.).

From the foregoing description, it will be appreciated that the invention makes available a novel method and apparatus for multipoint voice operation in a wireless, Ad-hoc environment, wherein a scheme for conference call establishment, maintenance, and bandwidth reservation over IP networks allows for half-duplex communication between a large number of call participants organized in a self-forming network supporting integrated voice/data traffic.

Having described preferred embodiments of a new and improved method and apparatus for multipoint voice operation in a wireless, Ad-hoc environment, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A wireless communication unit to transmit and receive information within a mobile, ad-hoc wireless communications network, including a plurality of wireless communication units arranged into first and second tiers, and to conduct a conference call with at least two other communication units within said network, wherein said first tier arranges said plurality of communication units into a plurality of groups without communication units being common between said first tier groups, each first tier group being associated with at least one communication unit designated as a base unit and including a communication unit designated as a head unit and one or more additional communication units designated as member units, and said second tier includes said communication units designated as said head units of each of said first tier groups arranged into at least one group, wherein said first tier provides communications between communication units within the same first tier group and said second tier provides communications between said head units of said first tier groups to enable member communication units within different first tier groups to communicate, said communication unit for residing in a first tier group and comprising:
   a transmitter to transmit outgoing information to at least one other communication unit within said network;
   a receiver to receive incoming information from at least one other communication unit within said network; and
   a processor to control transmission and reception of said outgoing and incoming information, wherein said processor includes:
      a call module to transfer voice information from said communication unit to at least two other communication units within said network, via a broadcast utilizing a time division multiplexing scheme, to conduct a conference call between at least three call participants, wherein the same voice information is transferred to each of said at least two other call participants via said broadcast and said broadcast enables constructive superposition of said voice information to enhance signal strength, and wherein said call module includes:
         a transfer module to transfer said voice information from said communication unit, when designated as a sole speaker during a portion of said conference call, over said first tier of said network via said broadcast utilizing said time division multiplexing scheme in response to a communication unit of at least one of said call participants residing within said first tier group including said communication unit, and to transfer said same voice information from said communication unit, when designated as said sole speaker during said portion of said conference call, over said second tier of said network via said broadcast utilizing said time division multiplexing scheme in response to a communication unit of at least one of said call participants residing external of said first tier group including said communication unit.

2. The communication unit of claim 1, wherein said time division multiplexing scheme includes time division multiple access (TDMA).

3. The communication unit of claim 1, wherein said transmitter transmits said outgoing information in the form of radio signals.

4. The communication unit of claim 1, wherein said receiver receives said incoming information in the form of radio signals.

5. The communication unit of claim 1, wherein said time division multiplexing scheme includes a time division multiplexing architecture including at least one epoch each with a plurality of time slots, and wherein a portion of said time slots are utilized for transference of said voice information and others of said time slots are utilized for transference of data associated with an access protocol.

6. The communication unit of claim 5, wherein said access protocol includes Carrier Sense Multiple Access/Collision Avoidance (CSMA/CA).

7. The communication unit of claim 1, wherein said transfer module includes:
   a call initiation module to facilitate transmission of a request to initiate said conference call to a head unit associated with said communication unit in response to said communication unit originating said conference call;
   a voice generation module to receive voice signals from a user and generate voice information for said conference call;
   a transmission module to facilitate transmission of said generated voice information to a base unit associated with said communication unit for transfer of said voice information for said conference call; and
   a call terminate module to facilitate transmission of a call terminate message to terminate said conference call.

8. The communication unit of claim 1, wherein said transfer module includes:
   a resource module to allocate resources for said conference call within a corresponding first tier group in response to said communication unit being designated as said head unit, wherein said resource module includes:
      a request module to facilitate reception of a request to initiate a conference call from a communication unit originating said conference call;
      an availability module to determine availability of resources for said requested conference call;
      a location module to determine the presence of call participant destinations external of said first tier group including said originating communication unit;
      an initialize module to set-up said conference call in response to the availability of sufficient resources for said conference call; and
      a terminate module to terminate said conference call.

9. The communication unit of claim 8, wherein each said second tier group designates a communication unit as a second tier head unit and said initialize module includes:
   a local resource allocation module to allocate resources for said conference call within a corresponding group including said originating communication unit within said first tier; and
   a remote resource allocation module to facilitate transmission of a request for resources to a head unit of a second tier group in response to the presence of said external destinations.

10. The communication unit of claim 9, wherein said terminate module includes:
   a call terminate module to de-allocate resources within said first tier to terminate said conference call.

11. The communication unit of claim 8, wherein each said second tier group designates a communication unit as a second tier head unit and said initialize module includes:
   a call resource module to determine availability of resources within said second tier for said requested conference call in response to the presence of said external destinations and said communication unit being designated as a head unit for a second tier group; and a remote resource allocation module to allocate resources for said conference call within said second tier in response to the availability of sufficient second tier resources for said conference call.

12. The communication unit of claim 11, wherein said terminate module includes:

a call terminate module to de-allocate resources within said second tier to terminate said conference call to said external destinations in response to said communication unit being designated as a head unit for a second tier group.

13. The communication unit of claim 1, wherein said transfer module includes:

a distribution module to distribute said voice information for said conference call to call participants in response to said communication unit being designated as said base unit.

14. The communication unit of claim 13, wherein said distribution module includes:

a call controller module to facilitate reception and processing of responses to conference call requests from other communication units and to generate a status report for said conference call;

a speaker module to designate and maintain the status of a communication unit as a speaker unit to generate said voice information for said conference call;

a source module to facilitate reception of said voice information from said speaker unit and to facilitate a broadcast of said received voice information via said time division multiplexing scheme to call participants; and a call terminate module to terminate said conference call.

15. The communication unit of claim 13, wherein at least one head unit of a second tier group is further designated as a base unit to facilitate communication between said first tier groups, and said distribution module includes:

a call controller module to facilitate reception of responses to conference call requests from communication units within a first tier group associated with said communication unit and to transmit said responses to a base unit of said first tier group including the communication unit originating said conference call in response to said communication unit being designated as a base unit within said second tier;

a destination base module to facilitate reception of voice information for said conference call via said second tier and to facilitate transmission of said received voice information to communication units within a first tier group associated with said communication unit in response to said communication unit being designated as a base unit within said second tier; and a call terminate module to terminate said conference call.

16. The communication unit of claim 1, wherein said transfer module includes:

a relay module to relay said voice information within said network via said time division multiplexing scheme in response to receiving said voice information without being a call participant.

17. The communication unit of claim 1, wherein said transfer module includes:

a destination module to receive and process said voice information for presentation to a user in response to said communication unit being a call participant.

18. The communication unit of claim 17, wherein said destination module includes:

a response module to generate a reply in response to a conference call request indicating participation in a conference call;

a voice module to process said voice information for presentation to said user;

a transmission module to facilitate transmission of said reply to a base unit associated with said first tier group including said communication unit; and a terminate call module to terminate participation in said conference call.

19. The communication unit of claim 1, wherein said receiver includes a RAKE type receiver to receive said voice information in a manner enabling constructive superposition to remove multi-path interference and enhance signal strength.

20. The communication unit of claim 1, wherein said transfer module includes:

a roam module to maintain participation of said communication unit within said conference call in response to said communication unit switching between said groups of said communications network.

21. A mobile, ad-hoc wireless communications network to transmit and receive information to conduct a conference call comprising:

a plurality of mobile wireless communication units arranged into first and second tiers, wherein said first tier arranges said plurality of communication units into a plurality of groups without communication units being common between said first tier groups and said second tier includes at least one group of communication units;

at least one mobile communication unit of each first and second tier group designated as a head unit to allocate and de-allocate resources within respective tiers for said conference call and one or more additional communication units within each of said first tier groups designated as member units, wherein said communication units of said second tier include communication units designated as said head units of each of said first tier groups arranged into said at least one group, and wherein said first tier provides communications between communication units within the same first tier group and said second tier provides communications between said head units of said first tier groups to enable member communication units within different first tier groups to communicate;

at least one mobile communication unit associated with a first tier group and designated as a source base station to transmit voice information from a communication unit within an associated group, when designated as a sole speaker during a portion of said conference call, over at least one of said first and second tiers to call participants; and at least one mobile communication unit associated with a first tier group and designated as a destination base station to receive transmitted voice information over said second tier and forward that information to communication units within that associated group;

wherein said source base station transmits said voice information to at least two other call participants via a broadcast utilizing a time division multiplexing scheme, and wherein the same voice information is transferred from said source base station to each of said at least two other call participants via said broadcast and said broadcast enables constructive superposition of said voice information to remove multi-path interference;

wherein said voice information is transmitted over said first tier of said network via said broadcast utilizing said time division multiplexing scheme in response to a communication unit of at least one of said call participants residing within said first tier group associated with said source base station, and wherein said same voice information is transmitted over said second tier of said network via said broadcast utilizing said time division multiplexing scheme in response to a communication unit of at least one of said call participants residing external of said first tier group associated with said source base station.

22. The communications network of claim 21, wherein said time division multiplexing scheme includes time division multiple access (TDMA).

23. The communications network of claim 21, wherein at least one mobile communication unit relays said voice information between said source and destination base stations via said time division multiplexing scheme in response to receiving said voice information without being a call participant.

24. The communications network of claim 21, wherein said mobile communication units each include a RAKE type receiver to receive said transmitted voice information in a manner enabling constructive superposition to remove multipath interference and enhance signal strength.

25. The communications network of claim 21, wherein said mobile communication units maintain participation within said conference call in response to switching between said groups of said communications network.

26. A method of conducting a conference call between at least three wireless communication units in a mobile, ad-hoc wireless communications network, wherein said network includes a plurality of communication units arranged into first and second tiers, wherein said first tier arranges said plurality of communication units into a plurality of groups without communication units being common between said first tier groups, each first tier group being associated with at least one communication unit designated as a base unit and including a communication unit designated as a head unit and one or more additional communication units designated as member units, and said second tier includes said communication units designated as said head units of each of said first tier groups arranged into at least one group, wherein said first tier provides communications between communication units within the same first tier group and said second tier provides communications between said head units of said first tier groups to enable member communication units within different first tier groups to communicate, said method comprising:

(a) transferring voice information between at least three communication units within said network, via a broadcast utilizing a time division multiplexing scheme, to conduct a conference call between at least three call participants, wherein the same voice information from a communication unit of a call participant is transferred to each of said at least two other call participants via said broadcast and said broadcast enables constructive superposition of said voice information to enhance signal strength, wherein said voice information from a communication unit of a call participant, when designated as a sole speaker during a portion of said conference call, is transferred over said first tier of said network via said broadcast utilizing said time division multiplexing scheme in response to communication units of at least two of said call participants residing within the same first tier group, and wherein said same voice information from said communication unit of said call participant, when designated as said sole speaker during said portion of said conference call, is transferred over said second tier of said network via said broadcast utilizing said time division multiplexing scheme in response to communication units of at least two of said call participants residing in different ones of said first tier groups.

27. The method of claim 26, wherein said time division multiplexing scheme includes time division multiple access (TDMA).

28. The method of claim 26, wherein said voice information is transferred in the form of radio signals.

29. The method of claim 26, wherein step (a) further includes:
 (a.1) transmitting a request from a communication unit originating said conference call to an associated head unit to initiate said conference call;
 (a.2) receiving voice signals from a user at a communication unit associated with a call participant and generating voice information for said conference call;
 (a.3) transmitting said generated voice information from said participant communication unit to a base unit associated with that communication unit for transfer of said voice information for said conference call; and
 (a.4) transmitting a call terminate message from said originating communication unit to terminate said conference call.

30. The method of claim 26, wherein step (a) further includes:
 (a.1) receiving at a head unit a request to initiate a conference call from an associated communication unit originating said conference call;
 (a.2) determining at said head unit availability of resources for said requested conference call;
 (a.3) determining at said head unit the presence of call participant destinations external of said first tier group including said originating communication unit;
 (a.4) establishing said conference call at said head unit in response to the availability of sufficient resources for said conference call; and
 (a.5) terminating said conference call at said head unit in response to at least one of a call terminate message and network conditions.

31. The method of claim 30, wherein each said second tier group designates a communication unit as a second tier head unit and step (a.4) further includes:
 (a.4.1) allocating resources for said conference call within a corresponding group including said originating communication unit within said first tier; and
 (a.4.2) transmitting a request for resources from said head unit to a head unit of a second tier group in response to the presence of said external destinations.

32. The method of claim 31, wherein step (a.5) further includes:
 (a.5.1) de-allocating resources within said first tier to terminate said conference call.

33. The method of claim 31, wherein step (a.4) further includes:
 (a.4.3) determining at said second tier head unit availability of resources within said second tier for said requested conference call in response to the presence of said external destinations; and
 (a.4.4) allocating resources within said second tier for said conference call at said second tier head unit in response to the availability of sufficient second tier resources for said conference call.

34. The method of claim 33, wherein step (a.5) further includes:
 (a.5.1) de-allocating resources within said second tier to terminate said conference call to said external destinations.

35. The method of claim 26, wherein step (a) further includes:
  (a.1) distributing said voice information for said conference call from a base unit to call participants.

36. The method of claim 35, wherein step (a.1) further includes:
  (a.1.1) receiving and processing at a base unit responses to conference call requests from other communication units and generating a status report for said conference call;
  (a.1.2) designating and maintaining at said base unit the status of a communication unit as a speaker unit to generate said voice information for said conference call;
  (a.1.3) receiving said voice information from said speaker unit and broadcasting from said base unit said received voice information via said time division multiplexing scheme to call participants; and
  (a.1.4) terminating said conference call at said base unit in response to at least one of a call terminate message and network conditions.

37. The method of claim 35, wherein at least one head unit of a second tier group is further designated as a base unit to facilitate communication between said first tier groups, and step (a.1) further includes:
  (a.1.1) receiving at a second tier base unit responses to conference call requests from communication units within a first tier group associated with that base unit and transmitting said responses to a base unit of said first tier group including the communication unit originating said conference call;
  (a.1.2) receiving over said second tier voice information for said conference call at said second tier base unit and transmitting said received voice information to communication units within a first tier group associated with said second tier base unit; and
  (a.1.3) terminating said conference call at said second tier base unit in response to at least one of a call terminate message and network conditions.

38. The method of claim 26, wherein step (a) further includes:
  (a.1) relaying said voice information at a communication unit within said network via said time division multiplexing scheme in response to receiving said voice information without being a call participant.

39. The method of claim 26, wherein step (a) further includes:
  (a.1) receiving and processing said voice information for presentation to a user at a communication unit associated with a call participant.

40. The method of claim 39, wherein step (a.1) further includes:
  (a.1.1) generating a reply at said communication unit associated with a call participant in response to a conference call request indicating participation in a conference call;
  (a.1.2) transmitting said reply from said communication unit associated with a call participant to a corresponding base unit;
  (a.1.3) processing said voice information for presentation to said user at said communication unit associated with a call participant; and
  (a.1.4) terminating participation in said conference call at said communication unit associated with a call participant in response to at least one of a call terminate message and network conditions.

41. The method of claim 26, wherein step (a) further includes:
  (a.1) maintaining participation of a communication unit within said conference call in response to that communication unit switching between said groups of said communications network.

* * * * *